United States Patent
Yoo et al.

(10) Patent No.: US 12,304,240 B2
(45) Date of Patent: May 20, 2025

(54) HUB BUILT-IN TYPE DRIVE AXLE

(71) Applicants: Hyundai Motor Company, Seoul (KR); Kia Corporation, Seoul (KR); HYUNDAI WIA Corporation, Changwon-si (KR)

(72) Inventors: Sung Su Yoo, Suwon-Si (KR); Seok Ho Bae, Seoul (KR); Hee Il Kim, Hwaseong-Si (KR); Chang Hee Jeong, Yongin-Si (KR); Bum Jae Lee, Yongin-Si (KR); Hee Joon Kim, Incheon (KR)

(73) Assignees: Hyundai Motor Company, Seoul (KR); Kia Corporation, Seoul (KR); HYUNDAI WIA Corporation, Changwon-si (KR)

( * ) Notice: Subject to any disclaimer, the term of this patent is extended or adjusted under 35 U.S.C. 154(b) by 452 days.

(21) Appl. No.: 17/829,067

(22) Filed: May 31, 2022

(65) Prior Publication Data
US 2022/0410624 A1    Dec. 29, 2022

(30) Foreign Application Priority Data

Jun. 28, 2021    (KR) .......................... 10-2021-0084017

(51) Int. Cl.
| | |
|---|---|
| *B60B 35/12* | (2006.01) |
| *B60B 27/00* | (2006.01) |
| *F16D 3/34* | (2006.01) |
| *F16D 3/84* | (2006.01) |
| *G01P 3/44* | (2006.01) |

(52) U.S. Cl.
CPC ........ *B60B 35/128* (2013.01); *B60B 27/0015* (2013.01); *B60B 27/0068* (2013.01); *B60B 27/0094* (2013.01); *F16D 3/34* (2013.01); *F16D 3/845* (2013.01); *G01P 3/44* (2013.01); *Y10S 464/906* (2013.01)

(58) Field of Classification Search
CPC .............. B60B 35/128; B60B 27/0015; B60B 27/0068; B60B 27/0094; F16D 3/34; F16D 3/845; G01P 3/44; Y10S 464/906
USPC .......................................... 464/178; 384/544
See application file for complete search history.

(56) References Cited

U.S. PATENT DOCUMENTS

| | | | |
|---|---|---|---|
| 5,492,417 A * | 2/1996 | Baker ................. | B60B 27/0005 384/544 |
| 7,419,434 B2 * | 9/2008 | Wormsbaecher .... | B60K 17/344 464/178 |
| 11,619,271 B2 * | 4/2023 | Yoo ........................ | F16D 3/2245 |

FOREIGN PATENT DOCUMENTS

| | | |
|---|---|---|
| JP | 11-13783 A * | 1/1999 |
| KR | 10-2015-0066940 | 6/2015 |

* cited by examiner

*Primary Examiner* — Greg Binda
(74) *Attorney, Agent, or Firm* — Morgan, Lewis & Bockius LLP

(57) ABSTRACT

A hub built-in type drive axle includes one hub housing assuming a role of an external race of a constant velocity joint and a role of a wheel hub simultaneously, wherein the outboard constant velocity joint center is positioned within the full length of the hub housing, and a structure in which a bear housing and a boot assembly ring, including a boot, do not rotate whether the driveshaft 1 rotates is maintained so that performance may be improved, durability may be enhanced, and noise may be minimized.

21 Claims, 11 Drawing Sheets

HUB BUILT-IN TYPE DRIVE AXLE

CROSS REFERENCE TO RELATED APPLICATION

The present application claims priority to Korean Patent Application No. 10-2021-0084017, filed Jun. 28, 2021, the entire contents of which is incorporated herein for all purposes by this reference.

BACKGROUND OF THE PRESENT DISCLOSURE

Field of the Present Disclosure

The present disclosure relates to a technology for a hub built-in type drive axle in which a wheel hub and a constant velocity joint are integrally formed.

Description of Related Art

The joints used in vehicles are for transferring rotational power (torque) between rotation shafts having different angles of rotation. A hook joint, a flexible joint, and the like are used in a driveshaft having a small power transmission angle, and a constant velocity joint is used in a driveshaft of a front-wheel-drive vehicle having a large power transmission angle.

Because the constant velocity joint can smoothly transfer power at constant velocity even when the intersection angle of the driveshaft and the driven shaft is large, the constant velocity joint is mainly used for the axle shaft of a front-wheel-drive vehicle having an independent suspension.

A wheel of a conventional drive wheel has a structure in which an external race of the constant velocity joint, which is manufactured separately from a wheel hub, is coupled by a spline through the wheel hub, and a hub nut is fastened to an end portion of the external race that passes through the wheel hub so that the external race of the constant velocity joint and the wheel hub are coupled.

The related art in which the external race of the constant velocity joint and the wheel hub are separately manufactured and then assembled by the spline and the hub nut as described above has a disadvantage in that the increase in the number of parts increases weight and costs, and in particular, a backlash caused by spline coupling and a loosening of the hub nut pose quality issues.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hub built-in type drive axle including a structure in which a wheel hub and a constant velocity joint are integrated and configured to achieve weight reduction and cost cut by reducing the number of parts and achieve high rigidity.

According to an exemplary embodiment of the present disclosure, the hub built-in type drive axle includes a hub housing to which a joint assembly coupled to an end portion of a driveshaft is inserted inward to be coupled and of which a hub bearing is coupled to an external circumferential surface, a shaft bearing coupled to the driveshaft, a bearing housing coupled to the shaft bearing, a boot assembly ring coupled to an external ring of the hub bearing, and a boot coupled to the bearing housing and the boot assembly ring at either end portion, wherein the bearing housing, the boot, and the boot assembly ring are coupled in a non-rotating structure whether or not the driveshaft rotates.

An internal ring of the shaft bearing is coupled to the driveshaft, an external ring of the shaft bearing is coupled to the bearing housing, the internal ring and the external ring of the shaft bearing are connected by bearing balls so that the bearing housing, the boot, and the boot assembly ring maintain a non-rotating structure even when the drive shaft rotates.

A shaft seal positioned on the side of the shaft bearing to fill the gap between the driveshaft and the bearing housing and maintain airtightness is further included.

A wheel speed sensor is coupled to the boot assembly ring, and a packing member is coupled to the portion in which the boot assembly ring and the wheel speed sensor are coupled to maintain airtightness.

The bearing housing includes a large-diameter portion, a small-diameter portion, and a step portion provided as a boundary between the large-diameter portion and the small-diameter portion formed in different sizes, wherein the shaft bearing and the shaft seal are coupled to the inside of the large-diameter portion and one end portion of the boot is fixedly coupled to the outside of the small-diameter portion by a boot band.

The shaft bearing and one end portion of the boot are supported by contact with the step portion of the bearing housing.

A boot assembly groove into which a boot is inserted when one end portion of the boot is coupled by a boot band is formed in a concave shape in the small-diameter portion of the bearing housing.

A flange portion for preventing damage to the boot is formed to bend inward at the end portion of the small-diameter portion of the bearing housing.

A boot fastening groove is formed in a concave shape at one end portion of the boot assembly ring, and the boot is inserted into the boot fastening groove to be coupled when the other end portion of the boot is fixedly coupled to one end portion of the boot assembly ring by the boot band.

The boot assembly ring includes a boot coupling portion to which the other end portion of the boot is coupled, an external ring coupling portion coupled to the external ring of the hub bearing, and a connection portion that connects the boot coupling portion and the external ring coupling portion and to which the wheel speed sensor is coupled, wherein the external ring coupling portion is inserted into the external ring of the hub bearing and coupled to contact with an internal surface of the external ring.

An encoder and an encoder ring are provided to face the wheel speed sensor on the outside of one end portion of the hub housing, an extension portion extending toward the external ring coupling portion of the boot assembly ring is formed at an end portion of the encoder ring, a protrusion portion protruding toward the hub housing is formed at the connection portion of the boot assembly ring, and a labyrinth structure is formed between the extension portion of the encoder ring and the protrusion portion of the boot assembly ring by the extension portion and the protrusion portion so that the mixing of the constant velocity joint grease and the hub bearing grease is prevented.

The boot assembly ring includes a bending portion extending from the external ring coupling portion in a "U"

shape, a protrusion portion protruding toward the hub housing is formed at the connection portion of the boot assembly ring, and a labyrinth structure is formed between the bending portion and protrusion portion by the bending portion extending from the external ring coupling portion and the protrusion portion of the boot assembly ring so that the mixing of the constant velocity joint grease and the hub bearing grease is prevented.

The boot assembly ring includes a boot coupling portion to which the other end portion of the boot is coupled, an external ring coupling portion coupled to the external ring of the hub bearing, and a connection portion that connects the boot coupling portion and the external ring coupling portion and to which the wheel speed sensor is coupled; the external ring of the hub bearing is inserted into the external ring coupling portion so that an outside of the external ring and an inside of the external ring coupling portion contact each other; and an O-ring for maintaining airtightness between the outside of the external ring of the hub bearing and inside of the external ring coupling portion is coupled.

The shaft bearing and a shaft seal are coupled to an inside of the large-diameter portion of the bearing housing, and the boot is fixedly coupled to the outside of the large-diameter portion of the bearing housing by a boot band.

The end portion of one end portion of the bearing housing is formed in a shape of a protrusion threshold extending in the longitudinal direction of the driveshaft to block the inflow of foreign substances.

A groove and a locking threshold for preventing boot separation are formed on the outside of the large-diameter portion of the bearing housing, and a stopper protrusion fixing a position of the boot in contact with the other end portion of the large-diameter portion is formed in the boot.

Either end portion of the boot is fixedly coupled to the bearing housing and the boot assembly ring respectively by the boot band, and the boot and the boot band are assembled and fastened inboard of the joint assembly.

A plurality of anti-slip protrusions is formed on an internal surface of the boot contacting with the bearing housing, a threshold for blocking the inflow of foreign substances into the bearing housing is formed to protrude toward the driveshaft at an end portion of the boot, and a threshold for blocking the grease leakage is formed to protrude inward at the other end portion of the boot.

An internal ring of the hub bearing is coupled to an external circumferential surface of the hub housing, two rows of bearing balls are assembled between the internal ring and the external ring of the hub bearing, an outboard internal ring of the internal rings of the hub bearing is supported by a step threshold of the hub housing, and an inboard internal ring is supported by the forming portion bending outboard from the inboard end portion of the hub housing.

The outboard constant velocity joint center is positioned inboard of the hub housing.

According to an exemplary embodiment of the present disclosure, the hub built-in built-in drive axle has a structure in which one hub housing assumes the role of the external race of the constant velocity joint and the role of the wheel hub simultaneously so that weight reduction and cost cut may be achieved through the reduction in the number of parts, the problems of noise at joints and backlash generated during power transfer may be resolved, and rigidity may be strengthened through the integration of the external race and the wheel hub in particular.

Furthermore, according to an exemplary embodiment of the present disclosure, the outboard constant velocity joint center is positioned within the full length of the hub housing so that the vehicle size in the inboard/outboard direction may be significantly reduced so that there is an advantage in terms of package and the reduced distance between the outboard constant velocity joint center and the wheel center portion may maximize the rigidity and the articulation angle.

Furthermore, the present disclosure maintains a structure in which the bearing housing and the boot assembly ring, including the boot, do not rotate even when the driveshaft rotates so that durability is improved and noise is minimized.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
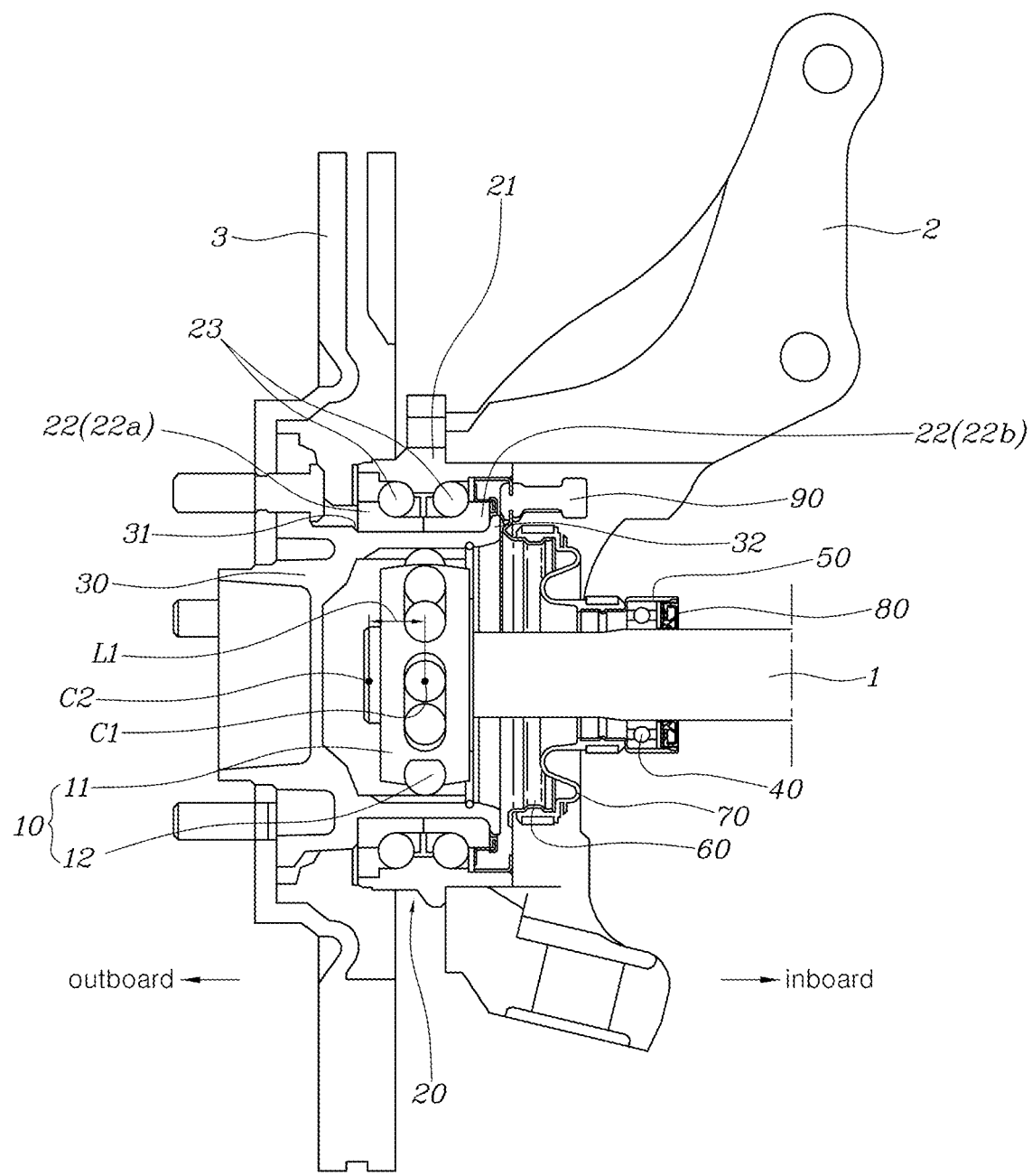
FIG. 1 is a view for describing a hub built-in type drive axle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The specific structural or functional descriptions of the exemplary embodiments included in the exemplary embodiment or application are merely exemplified for describing the exemplary embodiments according to an exemplary embodiment of the present disclosure. The exemplary embodiments of the present disclosure may be implemented in various forms, and the present disclosure is not to be interpreted as being limited to the exemplary embodiments described in the exemplary embodiment or application.

The exemplary embodiment according to an exemplary embodiment of the present disclosure may be subject to various modifications and have various forms so that specific embodiments will be illustrated in the drawings and described in detail in the exemplary embodiment or application. It is to be understood that this is not intended to limit the exemplary embodiments according to the concept of the present disclosure to the specific included forms and that all modifications, equivalents, and substitutes within the spirit and technical scope of the present disclosure are included.

Terms such as first, second, etc. may be used to describe various components, but the components are not to be limited by the terms. The terms may only be used for distinguishing one component from another. For example, without departing from the scope of the present disclosure, a first component may be denoted as a second component, and similarly, a second component may also be denoted as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present. Other expressions describing a relationship between components, that is, "between", "just between", "neighboring", and "directly neighboring" are to be interpreted in the same manner.

The terms used herein are used for describing specific embodiments only and are not intended to limit the present disclosure. Singular expressions include plural expressions unless the context explicitly indicates otherwise. In the exemplary embodiment, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts or combinations thereof in advance.

Unless otherwise defined, all terms used herein, including technical or scientific terms, may have the same meanings as are generally understood by those skilled in the art to which an exemplary embodiment of the present disclosure pertains. The terms such as those defined in commonly used dictionaries are to be interpreted as having meanings consistent with their meanings in the context of the related technology and are not to be interpreted in an idealized or overly formal sense unless expressly so defined herein.

It is to be noted that, according to various exemplary embodiments of the present disclosure, the control unit (controller) may be implemented through a processor configured to perform operations to be described below using nonvolatile memory configured to store algorithm configured to control operations of various components of a vehicle or data relating to the software commands for playing the algorithm or data stored in the corresponding memory. Here, the memory or the processor may be implemented as separate chips. Alternatively, the memory and the processor may be implemented as a single integrated chip. The processor may take the form of one or more processors.

A hub built-in type drive axle according to various exemplary embodiments of the present disclosure will be described with reference to the accompanying drawings in the following.

As illustrated in FIGS. 1 to 11, according to an exemplary embodiment of the present disclosure, a hub built-in type drive axle includes a hub housing 30 to which a joint assembly 10 coupled to an end portion of a driveshaft is inserted inward to be coupled and of which a hub bearing 20 is coupled to an external circumferential surface, a shaft bearing 40 coupled to the driveshaft 1, a bearing housing 50 coupled to the shaft bearing 40, a boot assembly ring 60 coupled to an external ring 21 of the hub bearing 20, and a boot 70 coupled to the bearing housing 50 and the boot assembly ring 60 at either end portion, wherein the bearing housing 50, the boot 70, and the boot assembly ring 60 are coupled in a non-rotating structure whether or not the driveshaft 1 rotates.

The driveshaft 1 is configured to transmit to a wheel the driving force of the engine transmitted through the transmission.

A joint assembly 10 coupled to an end portion of the driveshaft 1 includes an internal race 11 and a plurality of joint balls 12 coupled to the internal race 11.

A constant velocity joint includes a ball joint and a tripod joint, and the internal race 11 and the joint ball 12 are components of the ball joint.

The hub housing 30 assumes the role of an external race forming the constant velocity joint and the role of the wheel hub for coupling a wheel and a knuckle (or carrier) simultaneously, which has an effect of reducing the number of parts and the advantage of weight reduction and cost cut compared with the conventional structure in which the external race of the constant velocity joint and wheel hub are separately manufactured and then coupled to each other by a hub nut.

Furthermore, in the conventional structure in which the external race of the constant velocity joint and the wheel hub are separately manufactured and then coupled to each other, the coupling is completed when the external race of the constant velocity joint and the wheel hub are coupled by a spline and then fastened by a hub nut. The spline coupling structure and the hub nut coupling structure generate noise at joints and a problem of a backlash, and the loosening of the hub nut occurs in particular.

In contrast, according to various exemplary embodiments of the present disclosure, one hub housing 30 assumes the role of the external race of the constant velocity joint and the role of the wheel hub simultaneously so that weight reduction and cost cut may be achieved through the reduction in the number of parts, the problems of noise at joints and a backlash generated during power transmission may be resolved, and rigidity may be strengthened through the integration of the external race and the wheel hub in particular.

The external ring 21 of the hub bearing 20 is coupled to a knuckle 2, and the hub housing 30 is coupled to a disc 3 of the wheel.

The external ring 21 of the hub bearing 20 is coupled to a knuckle 2 in the case of a front wheel and is coupled to a planet carrier in the case of a rear wheel. Both the knuckle and the planet carrier will be simply referred to as a knuckle 2 in the exemplary embodiment of the present disclosure.

The hub housing 30 is also referred to as an axle housing but will be simply referred to as the hub housing 30 in the exemplary embodiment of the present disclosure.

According to an exemplary embodiment of the present disclosure, an internal ring 22 of the hub bearing 20 is coupled to an external circumferential surface of the hub housing 30, and two rows of bearing balls 23 are assembled between the internal ring 22 and the external ring 21 of the hub bearing 20 in the hub built-in type constant velocity joint.

The internal ring 22 of the hub bearing 20 includes an outboard internal ring 22a and an inboard internal ring 22b, and the outboard internal ring 22a is positioned outboard of the inboard internal ring 22b.

The outboard internal ring 22a of the internal ring 22 of the hub bearing 20 is supported by a step threshold 31 of the hub housing 30, and the inboard internal ring 22b is supported by an orbital forming portion 32 bending outwardly from an inboard end portion of the hub housing 30.

The forming portion 32 of the hub housing 30 supports the inboard internal ring 22b and maintains the optimum preload that satisfies the performance and durability.

The orbital forming portion 32 of the hub housing 30 has a structure for arresting the loosening of a conventional hub nut and facilitates the management of the preload amount of the hub bearing 20 so that the guarantee of durability is made easy and the productivity is improved.

Furthermore, according to an exemplary embodiment of the present disclosure, one hub housing 30 assumes the role of the external race of the constant velocity joint and the role of the wheel hub simultaneously in the hub built-in type constant velocity joint so that the outboard constant velocity joint center C1 may be positioned inboard of the hub housing 30.

That is, the increase in the length of the driveshaft 1 caused by the outboard movement of the constant velocity joint center C1 may improve the articulation angle of the driveshaft 1 and reduce the gap L1 between the outboard constant velocity joint center C1 and the wheel center portion C2 so that the rigidity and articulation angle may be maximized and the problems of torque steer caused by the articulation angle and a shudder vibration when a vehicle is set in motion may be resolved.

Furthermore, an increase in the use range of the articulation angle of the outboard joint may improve driving marketability by reducing the minimum turning radius.

Figure 2:
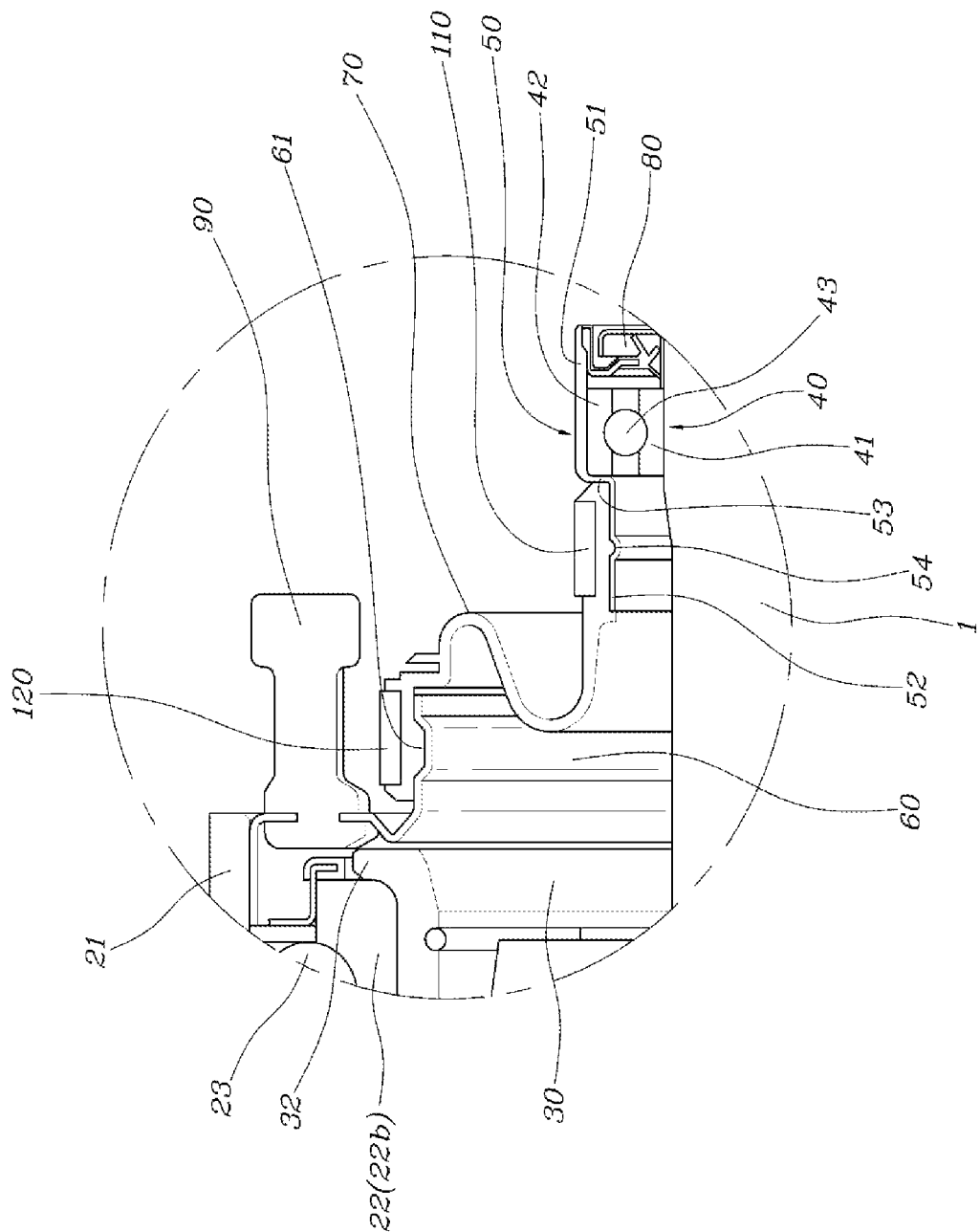
FIG. 2 is an enlarged view of a portion to which a boot is coupled in FIG. 1.

According to an exemplary embodiment of the present disclosure, as illustrated in FIG. 2, the shaft bearing 40 includes an internal ring 41, an external ring 42, and a bearing ball 43 provided between the internal ring 41 and the external ring 42, wherein the internal ring 41 of the shaft bearing 40 is coupled to the driveshaft 1 and the external ring 42 of the shaft bearing 40 is coupled to the bearing housing 50.

Accordingly, according to the exemplary embodiment of the present disclosure, the bearing housing 50, the boot 70, and the boot assembly ring 60 maintain the non-rotating structure by the shaft bearing 40 even when the driveshaft 1 rotates.

One end portion of the boot is directly coupled to the driveshaft in the conventional structure so that the boot rotates when the driveshaft rotates so that the durability of the boot is impaired and noise is generated.

In contrast, according to the exemplary embodiment of the present disclosure, the bearing housing 50 and the boot assembly ring 60, including the boot 70, maintain the non-rotating structure by the shaft bearing 40 so that the durability is improved and noise is minimized.

According to an exemplary embodiment of the present disclosure, the hub built-in type drive axle further includes a shaft seal 80 positioned on the side of the shaft bearing 40 to fill the gap between the driveshaft 1 and the bearing housing 50 and maintain airtightness.

The shaft seal 80 blocks the leakage of grease in the hub built-in type drive axle and the inflow of foreign substances.

Figure 5:
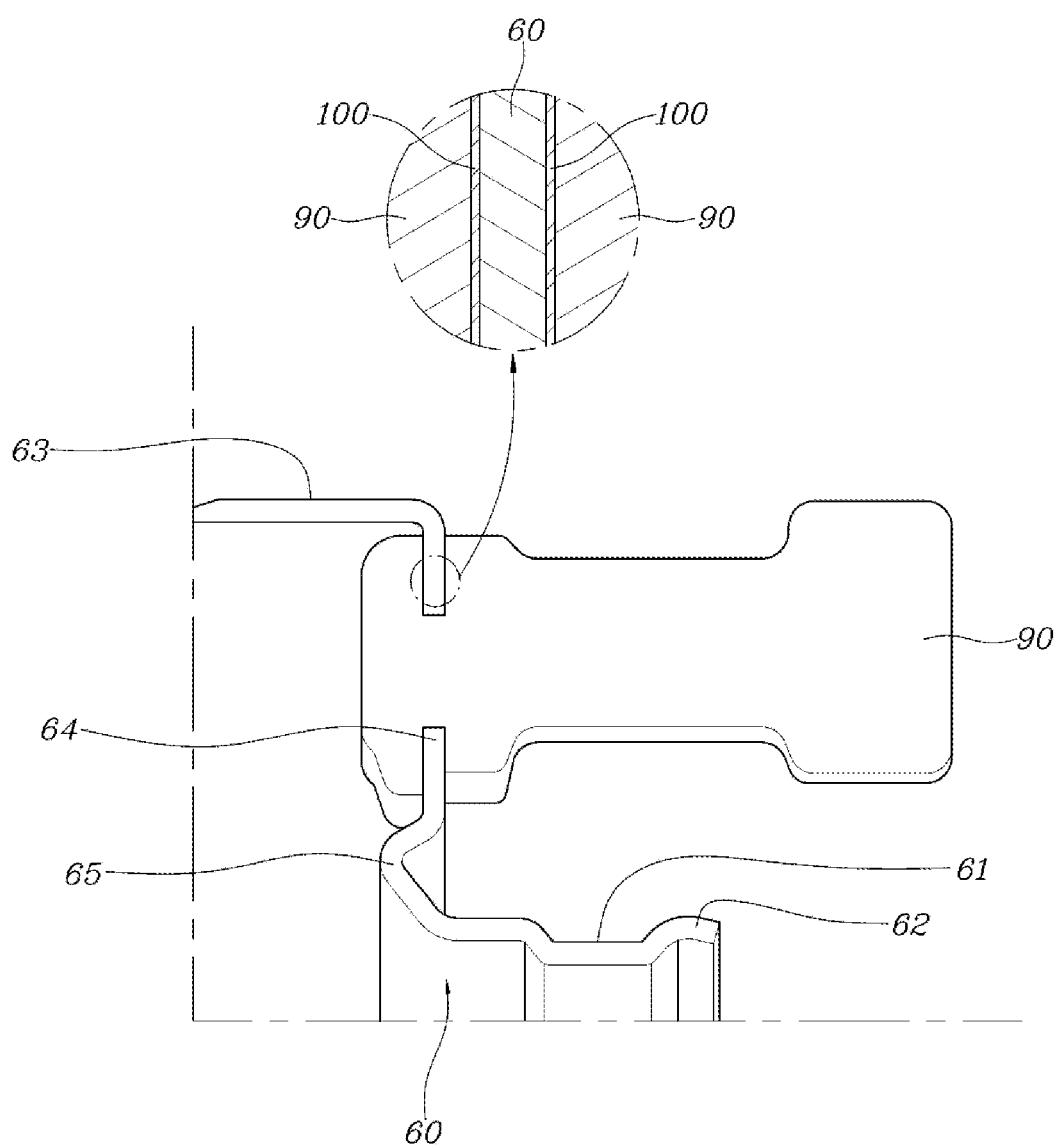
FIG. 5 is a cross-sectional view of a portion to which a wheel speed sensor is coupled in FIG. 4.

A wheel speed sensor (ABS sensor) 90 is coupled to the boot assembly ring 60, and a packing member 100 is coupled to the portion in which the boot assembly ring 60 and the wheel speed sensor 90 are coupled to each other (the portion of contact) to maintain airtightness as illustrated in FIG. 5.

Figure 4:
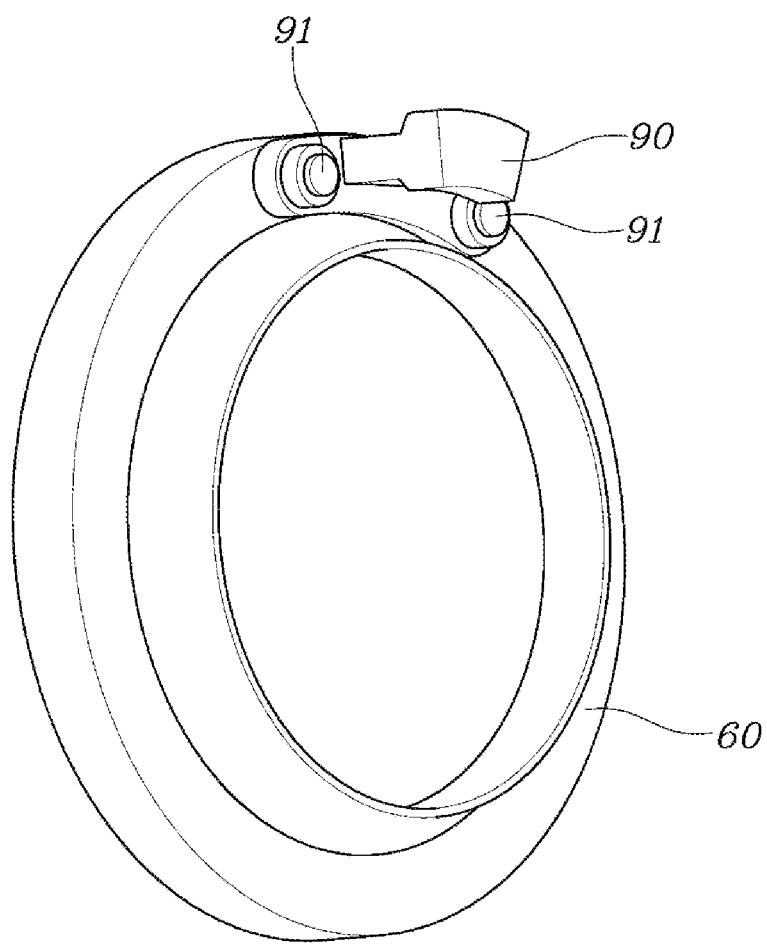
FIG. 4 is a perspective view of a boot assembly ring to which a wheel speed sensor is coupled.

The boot assembly ring 60 and the wheel speed sensor 90 may be separately manufactured and then coupled to each other by a coupling member 91 such as a bolt, a screw, or a rivet as illustrated in FIG. 4.

Alternatively, the boot assembly ring 60 and the wheel speed sensor 90 may be integrally manufactured by an insertion method at the time of manufacturing.

The packing member 100 includes a gasket made of a rubber material to serve as a seal.

Figure 3:
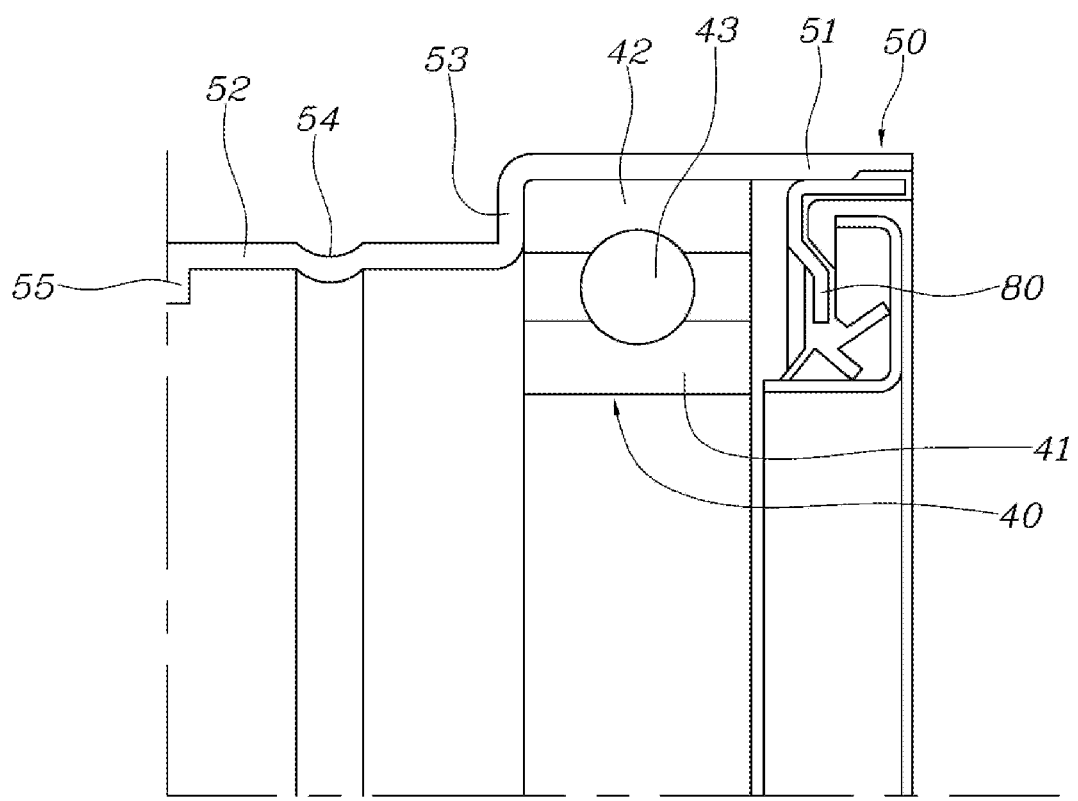
FIG. 3 is an enlarged view of a bearing housing.

The bearing housing 50 is formed in a shape of cylinder and includes a large-diameter portion 51, a small-diameter portion 52, and a step portion 53 provided as a boundary between the large-diameter portion 51 and the small-diameter portion 52 formed in different sizes as illustrated in FIG. 3.

The shaft bearing 40 and the shaft seal 80 are fixedly coupled to the inside of the large-diameter portion 51 of the bearing housing 50, and one end portion of the boot 70 is fixedly coupled to the outside of the small-diameter portion 52 of the bearing housing 50 by a boot band 110 as illustrated in FIG. 2.

One end portion described through the present disclosure is defined as an inboard direction, and the other end portion thereof is defined as an outboard direction.

The shaft bearing 40 and one end portion of the boot 70 are supported by contact with the step portion 53 of the bearing housing 50, and as a consequence, the step portion 53 of the bearing housing 50 is configured to fix the position of the shaft bearing 40 and the boot 70.

A boot assembly groove 54 into which the boot 70 is inserted when one end portion of the boot 70 is coupled by the boot band 110 is formed in a concave shape in the small-diameter portion 52 of the bearing housing 50 as illustrated in FIG. 2 and FIG. 3.

Assembling the boot 70 in a form of insertion into the boot assembly groove 54 allows the coupling force of the boot 70 to strengthen and the durability to improve.

A flange portion 55 for preventing damage to the boot 70 is formed to bend inward at the end portion of the small-diameter portion 52 of the bearing housing 50.

Inducing a surface-contact of the boot 70 through the flange portion 55 allows the prevention of damage such as tearing of the boot 70.

A boot fastening groove 61 is formed in a concave shape at one end portion of the boot assembly ring 60, and the boot 70 is inserted into the boot fastening groove 61 when the other end portion of the boot 70 is fixedly coupled to one end portion of the boot assembly ring 60 by a boot band 120.

Assembling the boot 70 in a form of insertion into the boot fastening groove 61 allows the coupling force of the boot 70 to strengthen and the durability to improve.

The boot assembly ring 60 includes a boot coupling portion 62 to which the other end portion of the boot 70 is coupled, an external ring coupling portion 63 coupled to the external ring 21 of the hub bearing 20, and a connection portion 64 that connects the boot coupling portion 62 and the external ring coupling portion 63 and to which the wheel speed sensor 90 is coupled.

The boot fastening groove 61 is formed in the boot coupling portion 62 in the boot assembly ring 60, and a packing member 100 is provided between the connection portion 64 and the wheel speed sensor 90.

Figure 6:
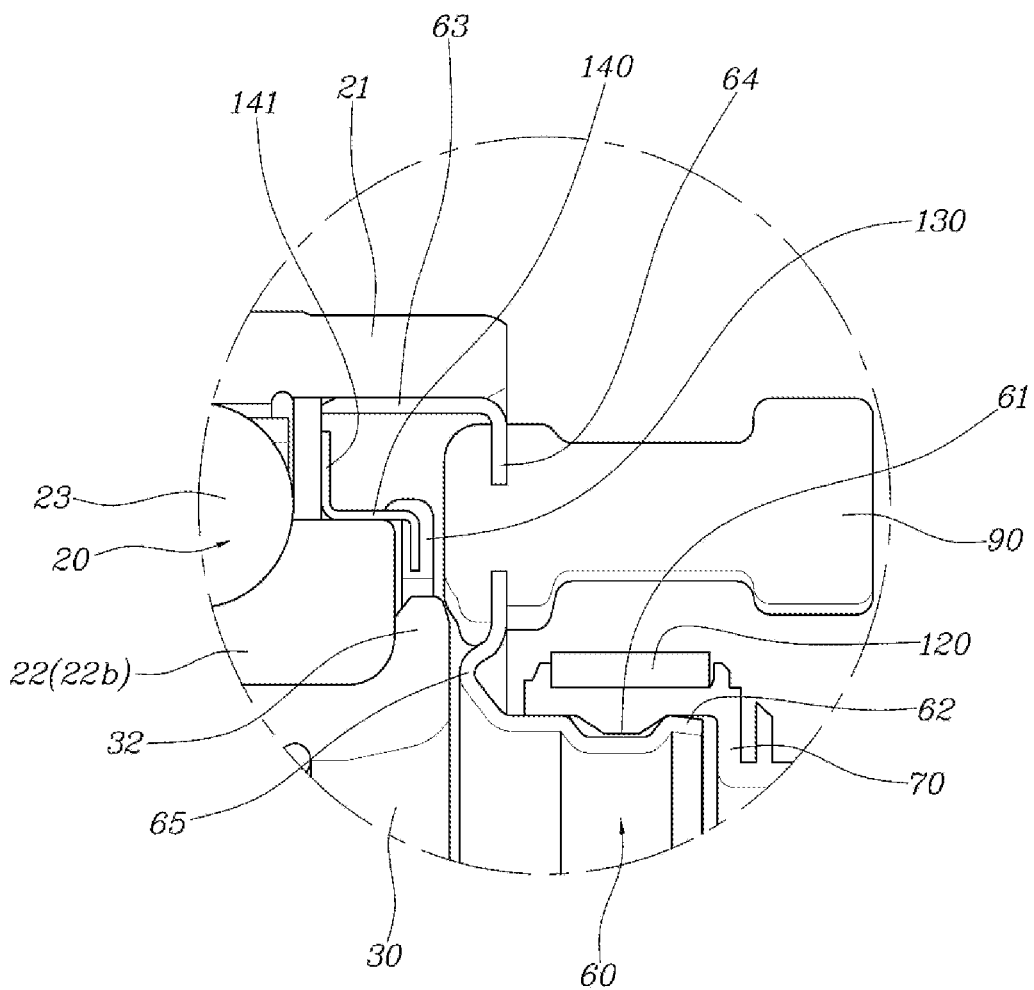
FIG. 6 is an enlarged view of a portion to which a wheel speed sensor is coupled in FIG. 1.

The external ring coupling portion 63 of the boot assembly ring 60 may be pressed into the external ring 21 of the hub bearing 20 as illustrated in FIG. 6 and coupled to contact with the internal surface of the external ring 21.

An encoder 130 and an encoder ring 140 are provided to face the wheel speed sensor 90 on the outside of one end portion of the hub housing 30, an extension portion 141 extending toward the external ring coupling portion 63 of the boot assembly ring 60 is formed at an end portion of the encoder ring 140, a protrusion portion 65 protruding toward the hub housing 30 is formed at the connection portion 64 of the boot assembly ring 60, and a labyrinth structure is formed between the extension portion 141 of the encoder ring 140 and the protrusion portion 65 of the boot assembly ring 60 by the extension 141 and the protrusion portion 65 so that the mixing of the constant velocity joint grease and the hub bearing grease may be prevented.

Figure 7:
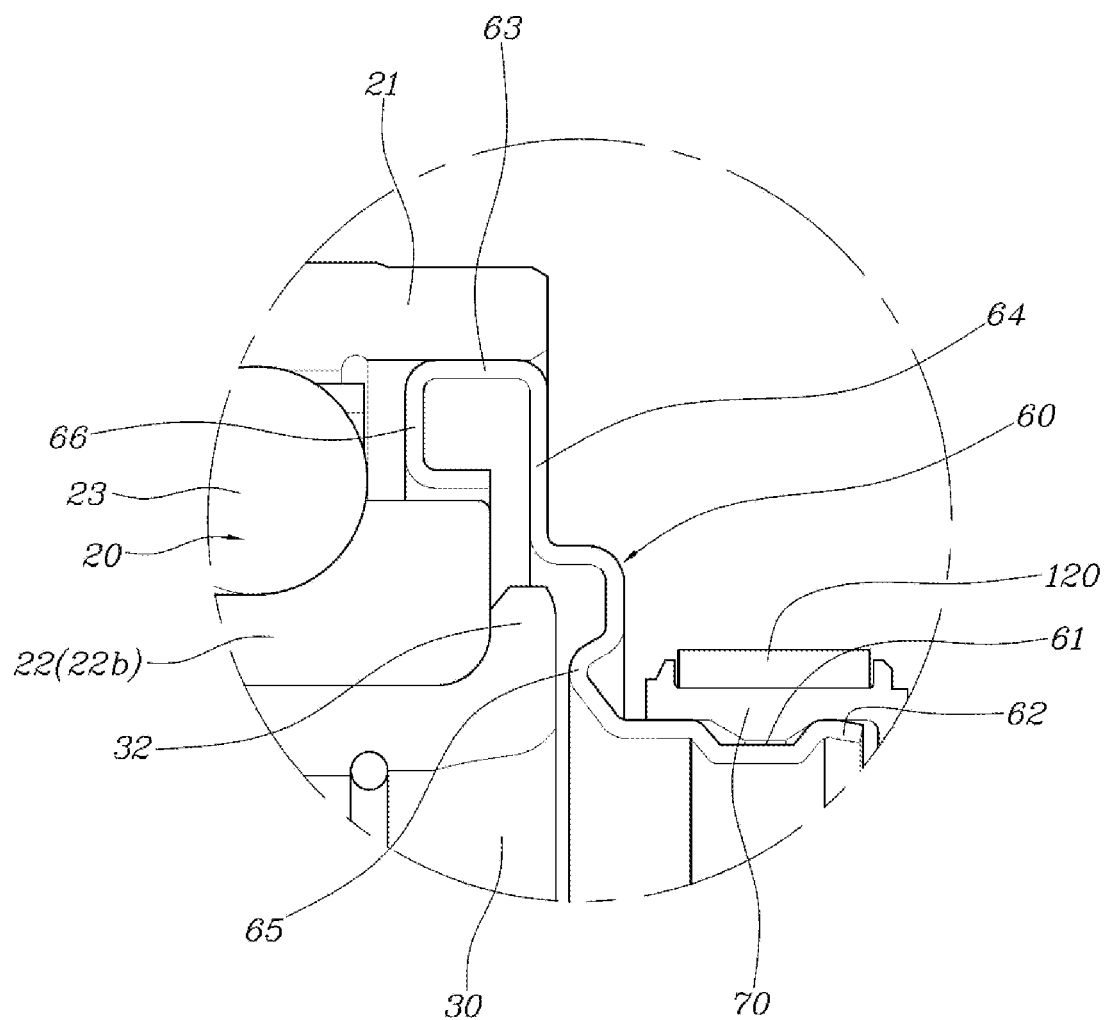
FIG. 7 and FIG. 8 are views for describing another exemplary embodiment of a boot assembly ring.

According to another exemplary embodiment of the present disclosure, as illustrated in FIG. 7, the boot assembly ring 60 includes a bending portion 66 extending from the external ring coupling portion 63 in a "U" shape, the protrusion portion 65 protruding toward the hub housing 30 is formed at the connection portion 64 of the boot assembly ring 60, and a labyrinth structure is formed between the bending portion 66 and the protrusion portion 65 by the bending portion 66 extending from the external ring coupling portion 63 and the protrusion portion 65 of the boot assembly ring 60 so that the mixing of the constant velocity joint grease and hub bearing grease may be prevented as much as possible.

Figure 8:
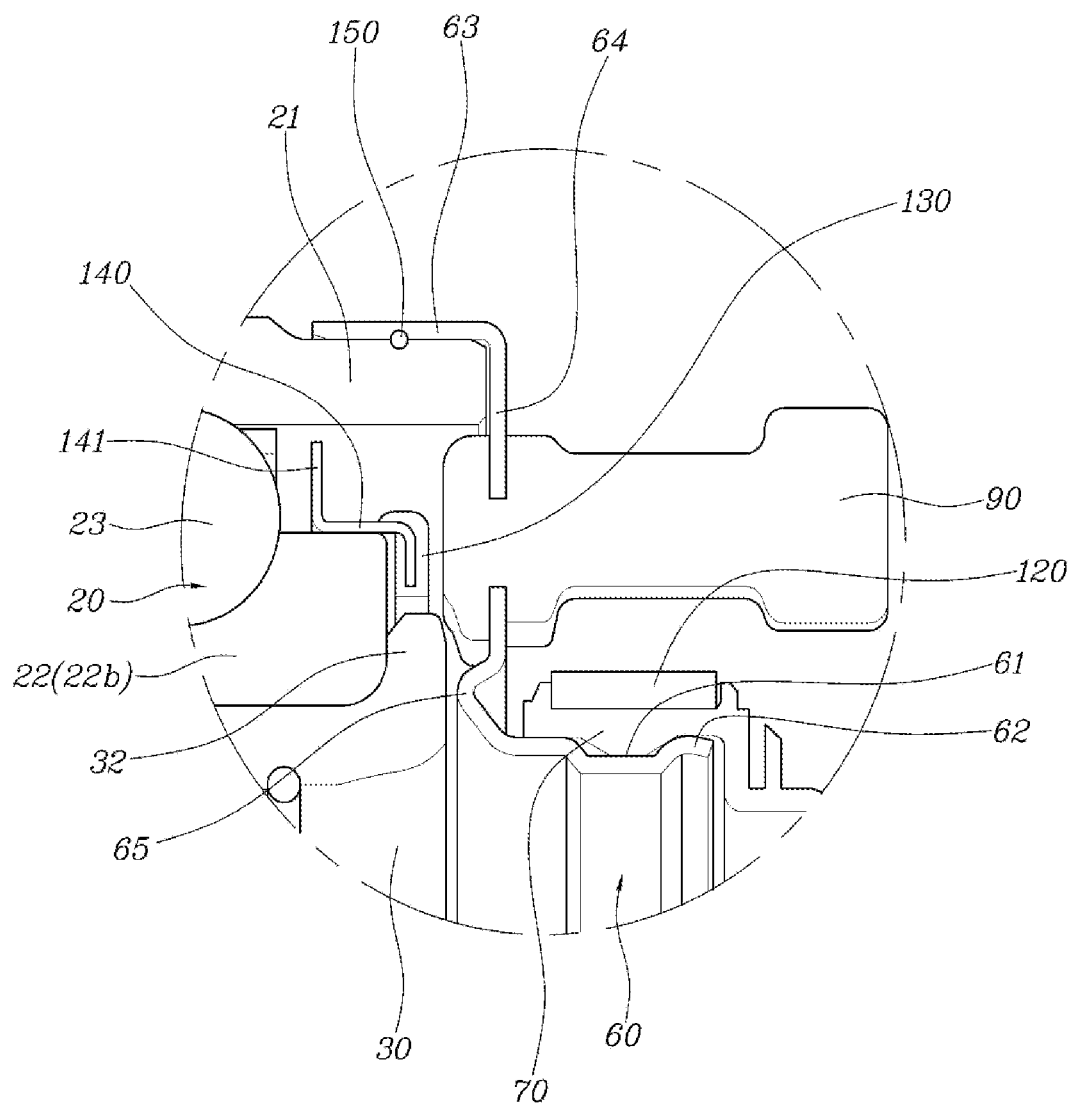

According to various exemplary embodiments of the present disclosure, as illustrated in FIG. 8, the boot assembly ring 60 includes the boot coupling portion 62 to which the other end portion of the boot 70 is coupled, the external ring coupling portion 63 coupled to the external ring 21 of the hub bearing 20, and the connection portion 64 that connects the boot coupling portion 62 and the external ring coupling portion 63 and to which the wheel speed sensor 90 is coupled; the external ring 21 of the hub bearing 20 is pressed into the external ring coupling portion 63 of the boot assembly ring 60 so that the outside of the external ring 21 and the inside of the external ring coupling portion 63 contact each other; and an O-ring 150 for maintaining the airtightness between the outside of the external ring 21 of the hub bearing 20 and the inside of the external ring coupling portion 63 is coupled.

Figure 9:
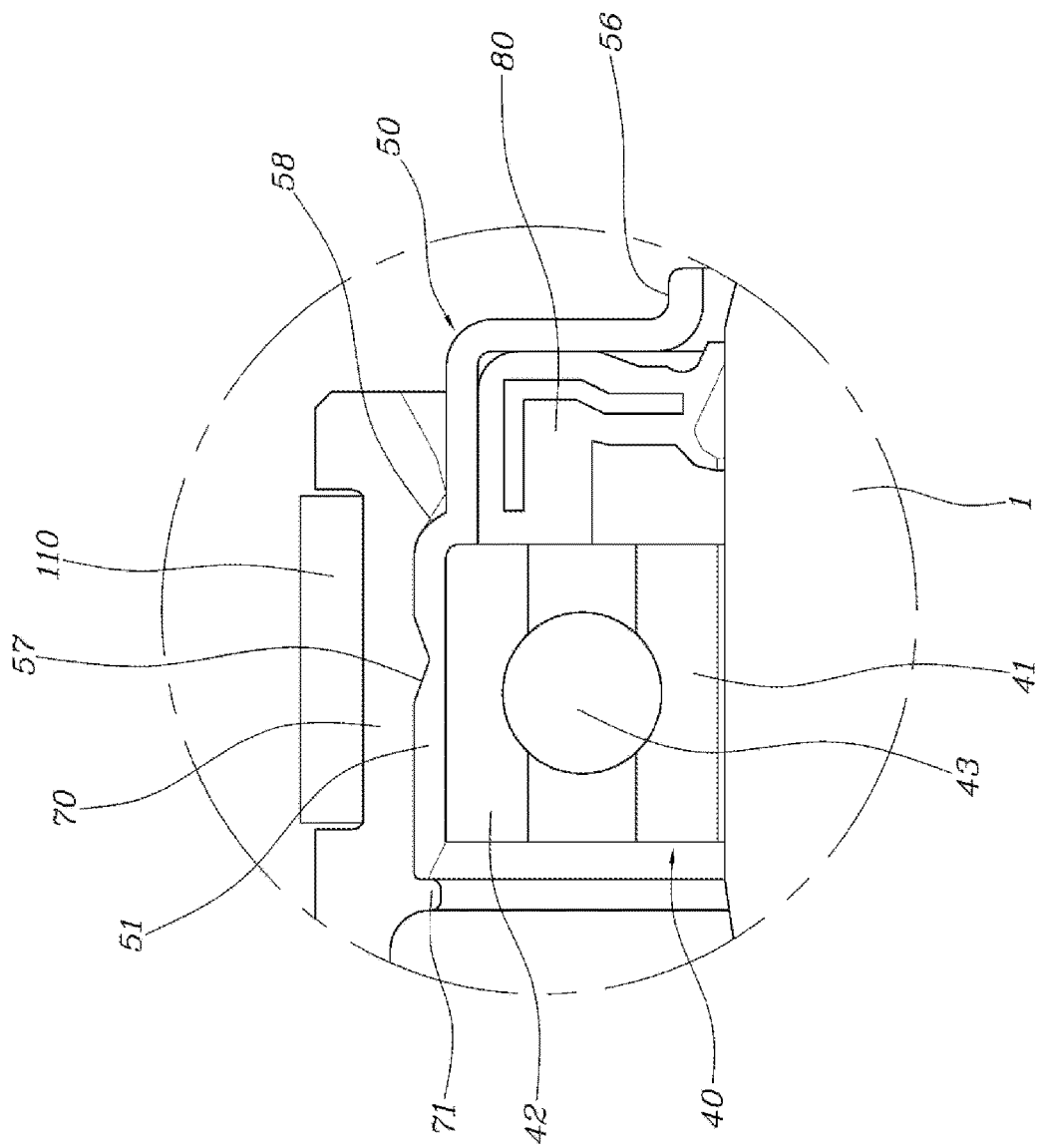
FIG. 9 is a view for describing another exemplary embodiment of a bearing housing.

As illustrated in FIG. 9, the shaft bearing 40 and the shaft seal 80 may be fixedly coupled to the inside of the large-diameter portion 51 of the bearing housing 50, and one end portion of the boot 70 may be fixedly coupled to the outside of the large-diameter portion 51 of the bearing housing 50 by the boot band 110.

At the present time, the end of one end portion of the bearing housing 50 is formed in a shape of a protrusion threshold 56 extending in the longitudinal direction of the driveshaft 1 so that the inflow of foreign substances may be blocked by the protrusion threshold 56.

A grove 57 and a locking threshold 58 for preventing boot separation are formed on the outside of the large-diameter portion 51 of the bearing housing 50 so that a portion of the boot 70 is inserted into the groove 57 for preventing boot separation and a portion of the boot 70 is locked when one end portion of the boot 70 is fixed by the boot band 110 so that the coupling force of the boot 70 is strengthened and the durability thereof is improved.

Furthermore, a stopper protrusion 71 fixing the position of the boot 70 in contact with the other end portion of the large-diameter portion 51 of the bearing housing 50 may be formed in the boot 70.

According to an exemplary embodiment of the present disclosure, one end portion thereof and the other end portion of the boot 70 are fixedly coupled to the bearing housing 50 and the boot assembly ring 60 respectively by the boot band 110, 120, and the boot 70 and the boot band 110, 120 are assembled and fastened inboard of the joint assembly 10 to facilitate assembly.

Figure 10:
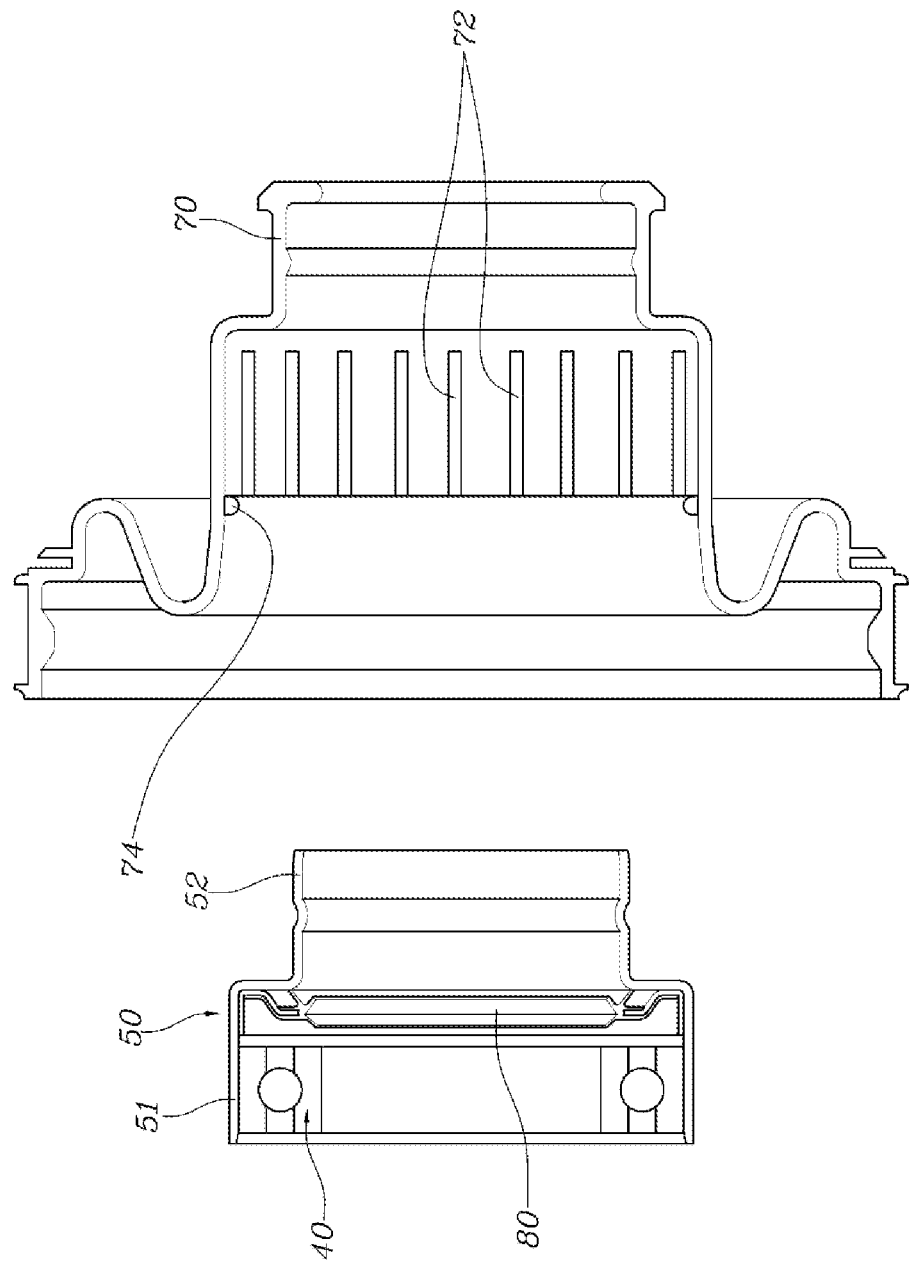
FIG. 10 is a view exemplarily illustrating an uncoupled state of a boot with anti-slip protrusions and a bearing housing.
Figure 11:
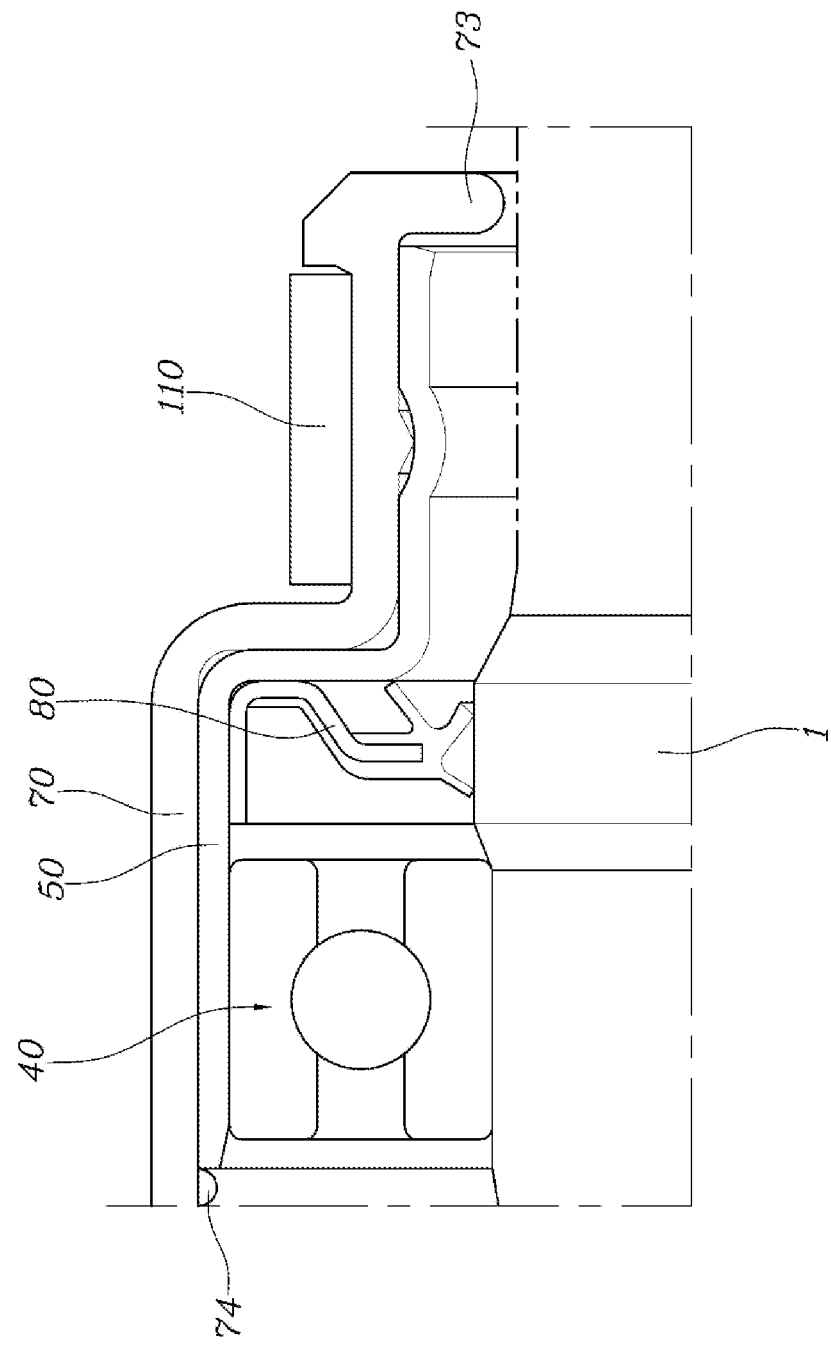
FIG. 11 is a view exemplarily illustrating a coupled state of a boot with anti-slip protrusions and a bearing housing in FIG. 10.

As illustrated in FIG. 10, and FIG. 11, a plurality of protrusions 72 is formed on the internal surface of the boot 70 contacting with the bearing housing 50, a threshold 73 for blocking the inflow of foreign substances into the bearing housing 50 is formed to protrude toward the driveshaft 1 at one end portion of the boot 70, and a threshold 74 for preventing the grease leakage is formed to protrude inward at the other end a portion of the boot 70.

As described above, according to an exemplary embodiment of the present disclosure, the hub built-in type drive axle has a structure in which one hub housing 30 assumes the role of the external race of the constant velocity joint and the role of the wheel hub simultaneously so that weight reduction and cost cut may be achieved through the reduction in the number of parts, the problems of noise at joints and backlash generated during power transmission may be resolved, and rigidity may be strengthened through the integration of the external race and the wheel hub in particular.

Furthermore, according to an exemplary embodiment of the present disclosure, the outboard constant velocity joint center C1 is positioned within the full length of the hub housing 30 so that the vehicle size in the inboard/outboard direction may be significantly reduced so that there is an advantage in terms of package and the reduced distance L1 between the outboard constant velocity joint center C1 and the wheel center portion C2 may maximize the rigidity and the articulation angle.

Furthermore, according to an exemplary embodiment of the present disclosure, the structure in which the bearing housing 50 and the boot assembly ring 60, including the boot 70, do not rotate even when the driveshaft 1 rotates is maintained so that the durability may be improved and the noise may be minimized.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hub built-in type drive axle comprising:
   a hub housing to which a joint assembly coupled to an end portion of a driveshaft is inserted inward to be coupled and of which a hub bearing is coupled to an external circumferential surface thereof;
   a shaft bearing coupled to the driveshaft;
   a bearing housing coupled to the shaft bearing;
   a boot assembly ring coupled to an external ring of the hub bearing; and
   a boot coupled to the bearing housing and the boot assembly ring at either end portion of the boot,
   wherein the bearing housing, the boot, and the boot assembly ring are coupled in a non-rotating structure whether or not the driveshaft rotates,
   wherein a wheel speed sensor is coupled to the boot assembly ring, and
   wherein a packing member is coupled to a portion in which the boot assembly ring and the wheel speed sensor are coupled to maintain airtightness.

2. The hub built-in type drive axle of claim 1,
   wherein an internal ring of the shaft bearing is coupled to the driveshaft,
   wherein an external ring of the shaft bearing is coupled to the bearing housing, and
   wherein the internal ring and the external ring of the shaft bearing are connected by bearing balls so that the bearing housing, the boot, and the boot assembly ring maintain the non-rotating structure even when the driveshaft rotates.

3. The hub built-in type drive axle of claim 1, further including a shaft seal positioned on a side of the shaft bearing to fill a gap between the driveshaft and the bearing housing and to maintain airtightness therebetween.

4. The hub built-in type drive axle of claim 3,
   wherein the bearing housing includes a large-diameter portion, a small-diameter portion, and a step portion provided as a boundary between the large-diameter portion and the small-diameter portion formed in different sizes,
   wherein the shaft bearing and a shaft seal are coupled to an inside of the large-diameter portion, and
   wherein a first end portion of the boot is fixedly coupled to an outside of the small-diameter portion of the bearing housing by a boot band.

5. The hub built-in type drive axle of claim 4, wherein the shaft bearing and the first end portion of the boot are supported by contact with the step portion of the bearing housing.

6. The hub built-in type drive axle of claim 4, wherein a boot assembly groove into which the boot is inserted when the first end portion of the boot is coupled by the boot band is formed in a concave shape in the small-diameter portion of the bearing housing.

7. The hub built-in type drive axle of claim 4, wherein a flange portion for preventing damage to the boot is formed to bend inward at an end portion of the small-diameter portion of the bearing housing.

8. The hub built-in type drive axle of claim 3,
   wherein the shaft bearing and the shaft seal are coupled to an inside of a large-diameter portion of the bearing housing, and
   wherein an end portion of the boot is fixedly coupled to an outside of the large-diameter portion of the bearing housing.

9. The hub built-in type drive axle of claim 8, wherein an end portion of the bearing housing is formed in a shape of a protrusion threshold extending in a longitudinal direction of the driveshaft to block an inflow of foreign substances.

10. The hub built-in type drive axle of claim 8,
    wherein a groove and a locking threshold for preventing boot separation are formed on the outside of the large-diameter portion of the bearing housing, and
    wherein a stopper protrusion fixing a position of the boot in contact with an end portion of the large-diameter portion is formed in the boot.

11. The hub built-in type drive axle of claim 1,
    wherein a boot fastening groove is formed in a concave shape at an end portion of the boot assembly ring, and
    wherein the boot is inserted into the boot fastening groove when a second end portion of the boot is fixedly coupled to the end portion of the boot assembly ring by a boot band.

12. The hub built-in type drive axle of claim 1, wherein the boot assembly ring includes:
    a boot coupling portion to which a second end portion of the boot is coupled;
    an external ring coupling portion coupled to the external ring of the hub bearing; and
    a connection portion that connects the boot coupling portion and the external ring coupling portion and to which a wheel speed sensor is coupled,
    wherein the external ring coupling portion is inserted into the external ring of the hub bearing and coupled to contact with an internal surface of the external ring.

13. The hub built-in type drive axle of claim 12,
    wherein an encoder and an encoder ring are provided to face the wheel speed sensor on the outside of an end portion of the hub housing,
    wherein an extension portion extending toward the external ring coupling portion of the boot assembly ring is formed at an end portion of the encoder ring, and
    wherein a protrusion portion protruding toward the hub housing is formed at the connection portion of the boot assembly ring.

14. The hub built-in type drive axle of claim 12,
    wherein the boot assembly ring includes a bending portion extending from the external ring coupling portion in a "U" shape, and
    wherein a protrusion portion protruding toward the hub housing is formed at the connection portion of the boot assembly ring.

15. The hub built-in type drive axle of claim 1, wherein the boot assembly ring includes:
    a boot coupling portion to which a second end portion of the boot is coupled;
    an external ring coupling portion coupled to the external ring of the hub bearing; and a connection portion that connects the boot coupling portion and the external ring coupling portion and to which the wheel speed sensor is coupled, wherein the external ring of the hub bearing is inserted into the external ring coupling portion so that an outside of the external ring and an inside of the external ring coupling portion contact each other, and wherein an O-ring for maintaining airtightness between the outside of the external ring of the hub bearing and the inside of the external ring coupling portion is coupled.

16. The hub built-in type drive axle of claim 1,
wherein either end portion of the boot is fixedly coupled to the bearing housing and the boot assembly ring respectively by a boot band, and wherein the boot and the boot band are assembled and fastened inboard of the joint assembly.

17. The hub built-in type drive axle of claim 1,
wherein a plurality of anti-slip protrusions is formed on an internal surface of the boot contacting with the bearing housing, wherein a threshold for blocking an inflow of foreign substances into the bearing housing is formed to protrude toward the driveshaft at a first end portion of the boot, and wherein a threshold for blocking a grease leakage is formed to protrude inward at a portion of the boot.

18. The hub built-in type drive axle of claim 1,
wherein an internal ring of the hub bearing is coupled to an external circumferential surface of the hub housing, wherein two rows of bearing balls are assembled between the internal ring and the external ring of the hub bearing, and wherein the internal ring of the hub bearing includes an inboard internal ring and an outboard internal ring, the outboard internal ring is supported by a step threshold of the hub housing, and the inboard internal ring is supported by a forming portion bending outboard from an inboard end portion of the hub housing.

19. The hub built-in type drive axle of claim 1, wherein an outboard constant velocity joint center is positioned inboard of the hub housing.

20. A hub built-in type drive axle comprising:
a hub housing to which a joint assembly coupled to an end portion of a driveshaft is inserted inward to be coupled and of which a hub bearing is coupled to an external circumferential surface thereof;
a shaft bearing coupled to the driveshaft;
a bearing housing coupled to the shaft bearing;
a boot assembly ring coupled to an external ring of the hub bearing; and
a boot coupled to the bearing housing and the boot assembly ring at either end portion of the boot,
wherein the bearing housing, the boot, and the boot assembly ring are coupled in a non-rotating structure whether or not the driveshaft rotates,
wherein either end portion of the boot is fixedly coupled to the bearing housing and the boot assembly ring respectively by a boot band, and
wherein the boot and the boot band are assembled and fastened inboard of the joint assembly.

21. A hub built-in type drive axle comprising:
a hub housing to which a joint assembly coupled to an end portion of a driveshaft is inserted inward to be coupled and of which a hub bearing is coupled to an external circumferential surface thereof;
a shaft bearing coupled to the driveshaft;
a bearing housing coupled to the shaft bearing;
a boot assembly ring coupled to an external ring of the hub bearing; and
a boot coupled to the bearing housing and the boot assembly ring at either end portion of the boot,
wherein the bearing housing, the boot, and the boot assembly ring are coupled in a non-rotating structure whether or not the driveshaft rotates,
wherein an internal ring of the hub bearing is coupled to an external circumferential surface of the hub housing,
wherein two rows of bearing balls are assembled between the internal ring and the external ring of the hub bearing, and
wherein the internal ring of the hub bearing includes an inboard internal ring and an outboard internal ring, the outboard internal ring is supported by a step threshold of the hub housing, and the inboard internal ring is supported by a forming portion bending outboard from an inboard end portion of the hub housing.

* * * * *